United States Patent [19]

Coleman et al.

[11] Patent Number: 5,013,795
[45] Date of Patent: May 7, 1991

[54] AZLACTONE GRAFT COPOLYMERS

[75] Inventors: Patrick L. Coleman; Richard J. Rolando, all of St. Paul, Minn.

[73] Assignee: Minnesota Mining and Manufacturing Company, St. Paul, Minn.

[21] Appl. No.: 335,284

[22] Filed: Apr. 10, 1989

[51] Int. Cl.$^5$ .................. C08F 255/02; C08F 255/08; C08F 257/02; C08F 226/06; C08G 63/91; G01N 33/563

[52] U.S. Cl. .................................... 525/279; 525/52; 525/54.1; 525/263; 525/284; 525/300; 436/513; 436/547; 436/548

[58] Field of Search ............... 525/279, 52, 54.1, 263, 525/284, 300

[56] References Cited

U.S. PATENT DOCUMENTS

| | | | |
|---|---|---|---|
| 3,177,270 | 4/1965 | Jones et al. | 260/878 |
| 3,488,327 | 1/1970 | Kollinsky et al. | 260/78.3 |
| 3,511,894 | 5/1970 | Markert | 260/875 |
| 3,583,950 | 6/1971 | Kollinsky et al. | |
| 3,598,790 | 8/1971 | Kollinsky et al. | 260/78.3 |
| 4,003,874 | 1/1977 | Ide et al. | 260/42.18 |
| 4,146,529 | 3/1979 | Yamamoto et al. | 260/42.18 |
| 4,228,255 | 10/1980 | Fujimoto et al. | 525/288 |
| 4,304,705 | 12/1981 | Heilmann et al. | 260/30.4 N |
| 4,508,869 | 4/1985 | Keskey et al. | 525/279 |
| 4,619,867 | 10/1986 | Charbonneau et al. | 428/355 |
| 4,695,608 | 9/1987 | Engler et al. | 525/308 |
| 4,737,560 | 4/1988 | Heilmann et al. | 526/304 |
| 4,902,749 | 2/1990 | Akkapeddi et al. | 525/279 |

FOREIGN PATENT DOCUMENTS 1393693 5/1975 United Kingdom .

OTHER PUBLICATIONS

"Polymer Handbook" Branderup & Immergut (Eds) Second Edition (1975), Wiley-Interscience.
Plastics Compounding, Jan./Feb. 1986, pp. 44–53 (Eise et al.).
Plastics Compounding, Sep./Oct. 1986, pp. 24–39 (Frund et al.).
Polymer Prep., 1986, 27,89 (Sahar).
Biomedical Applns of Immobilzed Enzymes, vol. 2, T. M. S. Chang, Ed. Plenum Publishing Corp., (Engvall).
Clin. Chem 1976, 22 (1243) (Winsdom).

Primary Examiner—John C. Bleutge
Assistant Examiner—Vasu S. Jagannathan
Attorney, Agent, or Firm—Gary L. Griswold; Walter N. Kirn; Carole Truesdale

[57] ABSTRACT

A graft copolymer is provided. The copolymer comprises a poly-alpha-olefin base polymer that does not undergo substantial crosslinking under polymer melt conditions in the presence of a free radical initiator, having grafted thereto a monomeric 2-alkenyl azlactone. The graft copolymers exhibit desirable thermoplastic, melt flow, and adhesion properties and are particularly useful for immobilizing proteins.

8 Claims, 1 Drawing Sheet

AZLACTONE GRAFT COPOLYMERS

BACKGROUND OF THE INVENTION

1. Technical Field

This invention relates to continuous processes using wiped-surface reactors for free-radical graft polymerization of polyolefins, and to graft copolymers thereby produced.

In another aspect, this invention relates to azlactones and copolymers thereof. In yet another aspect, this invention relates to the immobilization of proteins on synthetic polymers and more particularly to methods of immunoassay based on such binding.

2. Description of the Related Art

The processing and/or production of polymeric resins using wiped-surface reactors such as screw extruders and twin-screw extruders is well known (such processing is often referred to as reactive extrusion). Twin-screw extruders and their use in continuous processes such as graft polymerization, alloying, bulk polymerization of vinyl monomers, and condensation and addition reactions are generally described in *Plastics Compounding*, Jan./Feb. 1986, pp. 44–53 (Eise et al.) and *Plastics Compounding*, Sept./Oct. 1986, pp. 24–39 (Frund et al.). Graft reactions are said to be carried out by first melting a polymeric species in the initial stages of an extruder, injecting a peroxide catalyst into the extruder, and mixing in a monomer under high shear conditions. Advantages of the twin-screw extrusion process are said to include narrow distribution of molecular weight, improved melt-flow properties, consistent process control, and continuous processing.

Graft polymerization reactions of polyolefins with various monomers using wiped-surface reactors are known. Such grafting is said to be useful in providing a polymer adduct with functionality to allow further modification of structure and properties, and general mechanistic proposals regarding the formation of these "mechanochemically synthesized" adducts are discussed in connection with the grafting of maleic anhydride onto polypropylene in *Polymer Prep.*, 1986, 27, 89 (Al-Malaika). A number of particular free radical graft polymerization reactions have been reported. For example, U.S. Pat. No. 3,177,270 (Jones et al.) discloses a process of preparing graft copolymers by malaxing an olefin polymer at a temperature between 110° C. and 250° C. while contacting the polymer with a minor proportion of a mixture comprising a monovinyl aromatic compound and optionally one or more other monomers such as acrylic acid, methacrylic acid, acrylonitrile, methyl methacrylate, methacrylonitrile, or maleic anhydride, the mixture having dissolved therein an organic peroxide. British Pat. No. 1,393,693 (Steinkamp et al.) discloses the use of a single-screw extruder to graft monomers such as maleic anhydride and acrylic acid onto polyolefins such as polypropylene in the presence of a suitable free radical initiator such as an organic peroxide. The product graft copolymers are said to have a melt flow rate (MFR) of at least 50% greater than the MFR of the base polymer.

U.S. Pat. No. 4,003,874 (Ide et al.) discloses modified polyolefins obtained by adding an unsaturated carboxylic acid or an anhydride thereof and an organic peroxide to a polyolefin and melting these components in an extruder. The polyolefin so obtained adheres to glass fibers.

U.S. Pat. No. 4,146,529 (Yamamoto et al.) discloses a process for the production of modified polyolefins by combining a polyolefin with one or more carboxylic acids or their anhydrides in the presence of a radical producing agent in an extruder and in the presence of an organosilane.

U.S. Pat. No. 4,228,255 (Fujimoto et al.) discloses a method for crosslinking a polyolefin, the polyolefin being a low density polyethylene or a polyolefin mixture containing a low density polyethylene, comprising reacting the polyolefin with an organic silane and an organic free radical initiator to form a silane-grafted polyolefin, then mixing the silane-grafted polyolefin with a silanol condensation catalyst. The mixture is extruded with heating in a single-screw extruder to obtain a crosslinked polyethylene.

Monomeric 2-alkenyl-1,3-oxazolin-5-ones (which compounds and homologs thereof are referred to herein as 2-alkenyl azlactones) and copolymers thereof are known. Copolymers of 2-alkenyl azlactones and olefinically unsaturated monomers and coatings thereof are disclosed in U.S. Pat. No. 3,583,950 (Kollinsky et al.). Also, copolymers consisting essentially of a 2-alkenyl azlactone and an acrylic acid ester, and copolymerization thereof with vinylidene compounds having at least one hydroxyl group are disclosed in U.S. Pat. Nos. 3,488,327 and 3,598,790 (both to Kollinsky et al.). U.S. Pat. No. 4,695,608 (Engler et al.) discloses a bulk polymerization process for free radical polymerization of a vinyl monomer and a monomeric alkenyl azlactone or a macromolecular monomer with a molecular weight of less than about 30,000 in a wiped surface reactor such as a twin-screw extruder. Free radical initiator systems comprising a combination of reagents are useful in the process. Incorporation of alkenyl azlactones into acrylate pressure-sensitive adhesives improves the adhesives. Also disclosed in this patent are methods of preparation of 2-alkenyl azlactone monomers.

Among the myriad properties of some synthetic polymers is their ability to reversibly bind proteins. Many techniques for assay of protein-containing substrates are based on such binding. Enzyme linked immunosorbent assay, described in "Biomedical Applications of Immobilized Enzymes", Vol. 2, T.M.S. Chang, Ed. Plenum Publishing Corp., (Engvall) is but one such technique. ELISA and other enzyme immunoassay techniques such as those described in *Clin. Chem.* 1976, 22, 1243 (Wisdom) techniques generally use a material such as glass, polycarbonate, or polystyrene as a solid-phase immune adsorbent, which immobilizes one member of an immunological pair. The subsequent assay relies on competitive binding of the other member of the immunological pair in labeled and unlabeled form, to the immobilized member. One recognized disadvantage of the use of such techniques is that the immobilized protein is only physically adsorbed to the immune adsorbent such that adsorbed protein can be washed off to various degrees by rinsing or contact with aqueous buffer solutions. A decrease in assay accuracy, precision, and sensitivity can result from such "leakage" of the adsorbed protein.

SUMMARY OF THE INVENTION

This invention provides a graft copolymer comprising a poly-alpha-olefin base polymer that does not undergo substantial crosslinking under polymer melt conditions in the presence of a free radical initiator, having grafted thereto a monomeric 2-alkenyl azlactone of Formula I wherein
$R_1$ is hydrogen, or methyl;
$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and
n is an integer 0 or 1.

This invention also provides a process for preparing the azlactone graft copolymers described above, which process comprises:

(1) feeding to a reactor materials comprising
(a) a poly-alpha-olefin base polymer that does not undergo substantial crosslinking under polymer melt conditions in the presence of a free radical initiator;
(b) an effective amount of a free radical initiator system comprising one or more free radical initiators; and
(c) a monomeric 2-alkenyl azlactone as described above,
wherein all materials are substantially free of oxygen;

(2) reacting the materials in the reactor to provide a graft copolymer comprising the base polymer with 2-alkenyl azlactone moieties grafted thereon; and (3) withdrawing the graft copolymer from the reactor.

Further, the invention provides a method of immunoassay comprising the steps of:

(1) treating an article comprising an azlactone graft copolymer as described above, which article is selected from the group consisting of a microtiter well and a bead, with one member of an immunological pair;

(2) incubating the treated article with a solution suspected of containing the second member of the immunological pair; and (3) determining the amount of the second member of the immunological pair present in the solution.

The graft copolymers of the invention exhibit desirable thermoplastic, melt flow, and adhesion properties. Moreover, by virtue of the grafted azlactone moieties, the graft copolymers of the invention are useful for irreversibly binding (e.g., immobilizing) proteins.

Preferably, the base polymer is fed to the reactor in a region of the reactor preceding or coincident with the region in which the initiator system is fed and the monomeric 2-alkenyl azlactone is fed to the reactor in a region of the reactor subsequent to the region in which the initiator is fed.

A preferred embodiment of the process of the invention involves the use of at least two free radical initiators to minimize degradation of the base polymer and maximize the number of grafted 2-alkenyl azlactone moieties. The desired thermoplastic, melt-flow, adhesion, and protein binding properties of the product graft copolymer are thus optimized.

BRIEF DESCRIPTION OF THE DRAWING

FIG. 1 is an exemplary flow diagram of the process of the invention. Ancillary equipment known to those skilled in the art, such as pumps and valves, has not been illustrated, and secondary process streams such as utility lines (e.g., cooling water) have been omitted.

DETAILED DESCRIPTION OF THE INVENTION

A graft copolymer of the invention comprises a base polymer and a 2-alkenyl azlactone moiety grafted thereto via the alkenyl group. Suitable base polymers include poly-alpha-olefins that do not undergo substantial crosslinking under polymer melt conditions in the presence of a free radical initiator, i.e., the rates of crosslinking and chain extension of the base polymer are slow relative to the rate of degradation by chain scission, such that there is net degradation of polymer molecular weight under polymer melt conditions in the presence of a free radical initiator, such as under the thermal extrusion conditions described in detail below. This class of polymers is known to those skilled in the art and includes polymers such as polymethylmethacrylate, poly-4-methylpentene, polypropylene, polybutylene, polystyrene and the like. Such poly-alpha-olefins of virtually any molecular weight are suitable. For example, polypropylenes with a molecular weight of 40,000 to about 500,000 are suitable. Likewise, poly-alpha-olefins with a wide range of melt index values (e.g., from about 0.1 to about 1500) are suitable.

The 2-alkenyl azlactone monomers that can be grafted to the base polymer are known compounds, their synthesis being described for example in U.S. Pat. No. 4,304,705 (Heilmann et al.), the disclosure of which is incorporated herein by reference.

Suitable 2-alkenyl azlactones include:
2-ethenyl-1,3-oxazoline-5-one,
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4,4-dimethyl-1,3-oxazolin-5-one,
2-isopropenyl-4,4-dimethyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-4-methyl-4-phenyl-1,3-oxazolin-5-one,
2-isopropenyl-4-methyl-4-benzyl-1,3-oxazolin-5-one, and
2-ethenyl-4,4-pentamethylene-1,3-oxazolin-5-one, The preferred 2-alkenyl azlactones include 2-ethenyl-4,4-dimethyl-1,3-oxazolin-5-one (referred to herein as VDM) and 2-isopropenyl-4,4-dimethyl-1,3-oxazolin-5-one (referred to herein as IDM).

Preferably, a graft copolymer of the invention comprises about 0.1% to about 20%, more preferably 0.5 to about 10% by weight of grafted 2-alkenyl azlactone. In a process of the invention as described below it is preferred to use like quantities of 2-alkenyl azlactone, i.e., about 0.1 to about 20% or more by weight, more preferably 0.5 to about 10% by weight based on the weight of the base polymer.

In the process of the invention, the base polymer and the 2-alkenyl azlactone are reacted in a reactor in the presence of an initiator system comprising one or more free radical initiators. The initiator system serves to initiate free radical grafting of the 2-alkenyl azlactone. In the process of the invention, the base polymer, a poly-alpha-olefin that does not undergo substantial crosslinking under polymer melt conditions in the presence of a free radical initiator, is degraded in the reactor. It has been found, however, that the selection of an appropriate initiator system affords a product graft copolymer that better retains the molecular weight of the base polymer.

Many initiators are known. Suitable initiators include: hydroperoxides such as cumene, t-butyl, and t-amyl hydroperoxides, and 2,5-dihydroperoxy-2,5-dimethylhexane; dialkyl peroxides such as di-t-butyl, dicumyl, and t-butyl cumyl peroxides, 2,5-dimethyl-2,5-di(t-butylperoxy)hexane, and 2,5-dimethyl-2,5-di(t-butylperoxy)hex-3-yne; peroxyesters such as t-butyl perbenzoate and di-t-butyl-diperoxy phthalate, diacyl peroxides such as benzoyl peroxide and lauroyl peroxide; peroxyketals such as n-butyl-4,4-bis(t-butylperoxy)valerate and 1,1-di-t-butylperoxy-3,3,5-trimethylcyclohexane; and azo compounds such as azoisobutyronitrile.

The reaction conditions under which a graft copolymer of the invention is prepared typically involve heating at about 150° C. to about 250° C. The reactants typically have a residence time of about 1 to about 20 min. It is therefore difficult to select a single initiator with a decomposition rate such that initiating radicals will be present in a substantial concentration for a prolonged period of time when a relatively low concentration of initiator is used. It is therefore preferred to use a mixture of at least two initiators as an initiator system. Proper selection of the components of the initiator system overcomes the above-discussed difficulty with single initiators, and allows control and optimization of the physical properties of the product graft copolymer. Generally it is preferred that each initiator in an initiator system have a rate of decomposition substantially different from those of the other initiators in the initiator system. For example, in a process with a residence time of about 5-10 minutes at a temperature of about 200° C., an initiator system wherein one initiator has a half-life of about 30 seconds and the other initiator has a half-life of about 2 minutes has been found to be suitable. Preferred initiator systems include mixtures comprising from about 40% to about 60% by weight of 2,5-dimethyl-2,5-di(t-butylperoxy)hexane, (such as that commercially available as Lupersol TM 101 from Pennwalt Corporation) and from about 60% to about 40% by weight of an initiator such as 2,5-dimethyl-2,5-di(t-butylperoxy)hex-3-yne, (such as that commercially available as Lupersol TM 130 from Pennwalt Corporation), t-butylhydroperoxide, or di-t-butylperoxide. Initiator decomposition rates are temperature dependent, and other particular initiator systems and preferred concentration thereof can be selected by those skilled in the art consistent with the temperature of the reaction and the residence time of the reactants.

The total initiator concentration in a process of the invention as described below is preferably from about 0.1% to about 1%, more preferably from about 0.25% to about 0.5% based on the weight of the base polymer.

The azlactone graft copolymers of the invention can be prepared using various well known reactors such as stirred tank reactors, tubular reactors and extruders. The graft copolymers are preferably made by a process involving a wiped-surface reactor. A wiped surface reactor comprises a shell or vessel that contains at least one rotor having a wiping portion located close to the inside surface of the shell and a root portion that is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during the operation of the reactor.

Intermeshing twin screw extruders can be used as wiped surface reactors. The screws function as the rotors and the flight lands function as the wiping portion, while the screw root surface between the flight lands functions as the root surface. Clearances between the inside of the barrel wall of the extruder and the flight lands of the screws are preferably in the range of about 0.25 to 0.5 mm. Although co-rotating twin screw extruders can be used, counter-rotating twin screw extruders are preferred. The counter-rotating extruder acts as a positive displacement pump conveying the reactant stream, and it also behaves like a series of small mixing zones or continuous stirred tank reactors. The counter-rotating twin screw extruder also gives good control over melting, mixing, and reaction temperatures.

Preferably, the screws of a counter-rotating twin screw extruder are divided into segments, i.e., the extruder screws can be composed of a number of separate screw segments that fit onto a common drive shaft by means of a keyway and can be disassembled and rearranged in various orders and configurations. It is also possible to utilize screw segments having multiple (e.g., two or three) starts and various pitch, and one or more screw segments can be reversed in order to increase mixing. Residence time of the reactants, and thus the properties of the resultant product, can therefore be varied by selection of screw pitch and/or screw speed (i.e., screw rpm). Furthermore, each particular zone of a twin screw extruder can be independently heated or cooled by external heating or cooling means, allowing further control of reaction conditions.

Figure 1:
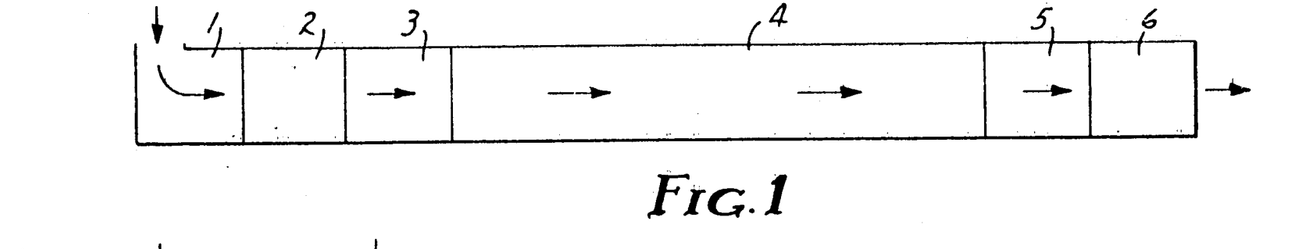

The use of a wiped surface reactor in the process of the invention is discussed with reference to FIG. 1. The base polymer can be fed in a region of the reactor coincident with the region in which the initiator system is fed. For example, the desired base polymer, preferably in pellet form, can be wetted with a free radical initiator system and purged with an inert gas such as nitrogen, helium, argon or the like, to render the material substantially free of oxygen (i.e., oxygen, if present, is present in an amount such that it does not significantly affect the desired free radical polymerization reactions). It is preferred to carry out the reaction under anhydrous conditions to prevent hydrolysis of the azlactone. This material can be fed at a predetermined rate into the feed zone 1 of the wiped surface reactor. It is preferred, however, to feed the base polymer in a region of the reactor prior to the region in which the initiator system is fed. The feed zone 1 typically comprises a feed throat, into which the base polymer can be fed into the upstream end, and into which the initiator system can be fed at the downstream end. A further alternate method of feeding the base polymer and the initiator involves the use of a 2-component feed zone consisting of a base polymer feed zone into which the base polymer is fed, followed in sequence by a separate initiator feed zone into which the initiator is fed. The extruder is preferably starve fed, i.e., all material fed into the feed zone is conveyed into the initiation/melt zone 2 of the extruder, and nothing is held up in the feed zone 1. Feed rates can vary with the size of the reactor and for any given size of reactor, one skilled in the art will be able to determine suitable feed rates. As an example, when a Leistritz TM 34 mm counter-rotating twin screw extruder is used feed rates are preferably from about 0.4 Kg/h to about 9 Kg/h. The feed zone screw preferably has a high pitch (e.g., 20 mm) to accommodate base polymer pellets. The feed zone can, if desired, be operated in a temperature controlled manner, depending on the reactants, reaction conditions and the like. Generally, it is suitable to maintain the feed zone of the extruder in a temperature range from about 10° C. to about 50° C., depending on the base polymer used.

In the initiation/melt zone 2, the initiator system and the base polymer are mixed and heated to initiate radical chain reactions. Preferred temperatures will depend on the particular base polymer and initiator system, but generally temperatures in the range between 150° C. and about 250° C. are suitable.

In the monomer addition zone 3, a nitrogen-purged 2-alkenyl azlactone monomer is added, usually by means of a high pressure pump and under an inert atmosphere. The 2-alkenyl azlactone is generally fed as a liquid or as a solution in an inert solvent (e.g., decane, toluene, tetrahydrofuran or the like). Again, feed rates are variable, and when a Leistritz TM 34 mm counter-rotating twin screw extruder is used, feed rate is preferably about 4 g/h to about 180 g/h. It is preferred to maintain the monomer addition zone at a temperature of about 150° C. to about 250° C.

Grafting and other polymerization proceeds in the reaction zone 4. The reaction zone is heated. As with the initiator/melt zone, the preferred temperature will depend on the particular base polymer and initiator system used. Further, the preferred temperature of the reaction zone will depend on the intended residence time in the reaction zone. Generally, temperatures in the range of 150° C. to 250° C. and residence times in the range of 1 minute to 10 minutes are suitable.

In reactions where there remains residual monomer, it is preferred to remove the residual monomer by venting. This can be done in devolatilization zone 5, where a vacuum (e.g., about 10 kPa absolute pressure) can be applied to a vent line. The resultant product is passed through the block zone 6, which conveys the product graft copolymer for any further processing s desired, e.g, shaping in a die, quenching in a suitable quenching liquid, or pelletizing for convenience of handling and/or storage. The product graft copolymer can also be pelletized to useful dimensions for use without further processing.

A graft copolymer of the invention has myriad applications. For example, when an adhesive tape is adhered to a sample of a graft copolymer of the invention, the tape adheres more tenaciously than the same tape adhered to a polypropylene surface. Also, when a graft copolymer of the invention is heated to the melt state and coated onto a metal surface (e.g., aluminum foil, chrome plating), the copolymer bonds well to the metal surface. Such properties suggest applications such as thermoplastic adhesives and tie layers for barrier films.

Through the azlactone moieties, a graft copolymer of the invention can irreversibly bind proteins such as, for example, antibodies and antigens. A copolymer of the invention can be prepared, for example, in the form of an article such as a microtiter well or in the form of beads. To bind a protein to the surface of the article, the article can be contacted, e.g., incubated, with a protein, e.g., a solution or a serum containing a protein. The protein can be, for example, an antibody such as anti-human IgE, or a protein such as Protein A. The protein can also, if desired, contain a trace level of labeled (e.g., radiolabeled or fluorescence-labeled) protein to allow assay of the protein. An article with a protein bound thereto can then be further incubated with a relatively concentrated second protein solution such as bovine serum albumin to react with and block any remaining azlactone moieties on the surface of the article and to displace adsorbed initial protein from the surface of the article.

An article treated as described above can be treated (e.g., incubated) with a protein denaturing agent such as sodium dodecylsulfate (SDS) to further remove adsorbed protein from the surface. Analysis of the resulting article shows that significantly more protein is retained by a graft copolymer of the invention than by base polymer.

The increased irreversible binding of proteins such as antibodies by graft copolymers of the invention suggests utility in applications where protein immobilization is desirable, e.g., diagnostic applications in which proteins are immobilized, including microtiter well assay devices, bead suspensions, and the like. Cells bind poorly to hydrophilic and hydrophobic base polymers. It is known, however, that a proteinaceous layer will promote binding of cells. This invention allows one to attach proteins such as albumins, collagens, basement membrane fractions, etc., or specific proteins such as fibronectin, laminin, monoclonal antibodies, or adhesion proteins, etc., all of which can promote binding of cells to a polymer surface.

In the following non-limiting examples all parts and percentages are by weight unless otherwise specified, all solutions are aqueous unless otherwise specified, and all temperatures are in degrees Centigrade unless otherwise specified.

EXAMPLES

Examples 1-9

This example describes the graft copolymerization of a 2-alkenyl azlactone monomer onto polypropylene, using a twin-screw extruder in counter-rotating mode.

Polypropylene resin base polymer (Dypro TM 8771 pellets, melt index: 9, commercially available from Fina Co., Houston, Tex.) was mixed in a 5-gallon shaker with 0.25% by weight of 90% liquid 2,5-dimethyl-2,5-di(t-butylperoxy)hexane (Lupersol TM 101, Pennwalt Corporation, Buffalo, N.Y.) and 0.25% by weight of one of the following: (a) 90-95% liquid 2,5-dimethyl-2,5-di(t-butylperoxy)hex-3-yne (Lupersol TM 130, Pennwalt); (b) 90% liquid 5-butyl hydroperozide (TBHP 90 TM, Pennwalt); (c) 98.5% liquid di-t-butyl peroxide (Pennwalt).

This base polymer/initiator mixture was then purged with nitrogen for 30 minutes. The resin in the feed hopper and in the feed zone of the extruder was kept under nitrogen purge and the base polymer/initiator mixture was fed with an augered feed means into the feed zone of a 34 mm counter-rotating Leistritz (Leistritz ™ model LSM 30.34GG, Nuremburg, West Germany) twin-screw extruder (length to diameter (L/D)=35:1) configured as described below with reference to FIG. 2.

Figure 2:
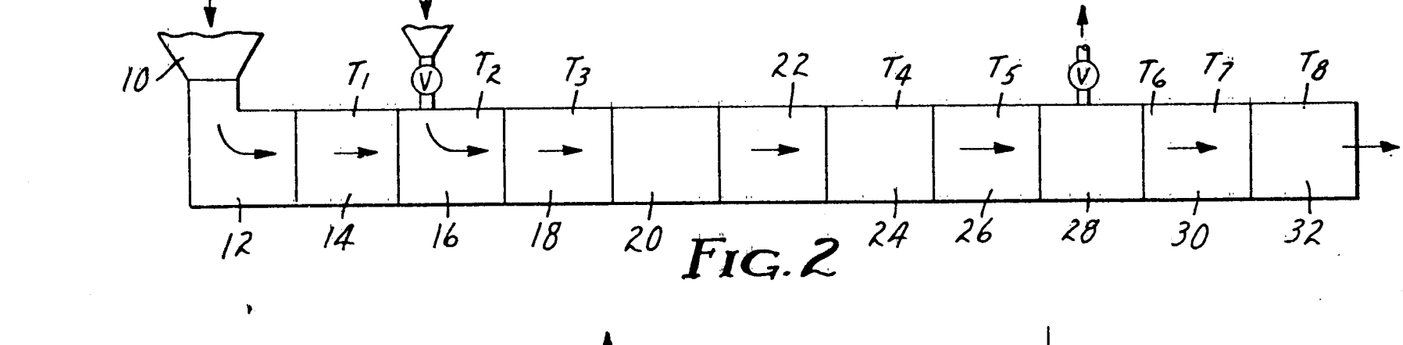
FIG. 2 is a flow diagram of a counter-rotating twin screw extruder useful in the process of this invention.

FIG. 2 shows a twin-screw extruder with a feed hopper 10, feed zone 12, and a heated barrel that comprises: an initiation/melt zone comprising barrel section 14; a reaction zone comprising a monomer feed zone (barrel section 16) and barrel sections 18, 20, 22, 24, and 26; a devolatilization zone comprising barrel section 28; and a block zone comprising barrel sections 30 and 32. Each barrel section is 120 mm long, and the extruder has a total length of 1200 mm.

Transducer ports (e.g., $T_4$ represents transducer number 4 located in barrel section 24) are located at 30 mm, and/or 90 into each heated barrel section. Thermocouple ports are located at 60 mm into each heated barrel section. Melt temperatures of 180° C., 200° C., and 220° C. were used with each initiator system. Polymer/initiator flow rate was kept at around 40-50 g/min. Monomeric vinyl azlactone (2-ethenyl-4,4-dimethyl-2-oxazoline-5-one, VDM) was purged with nitrogen and added to a nitrogen-purged Ruska ™ positive displacement pump, and added in heated barrel section 16, 270 mm from the start of the screws, at a rate of 2 mL/min. In heated barrel section 28 residual monomer was removed by vacuum. The product graft copolymers were conveyed from the block zone (barrel sections 30 and 32), which was maintained at 180° C., into a water bath and fed into a pelletizer to afford generally cylindrical beads of 3 to 4 mm in length and a diameter of about 1 mm. Reaction conditions are summarized in Table 1, wherein L101 designates Lupersol ™ 101, L130 designates Lupersol ™ 130, TBHP designates t-butyl hydroperoxide, and DTBP designates di-t-butyl peroxide.

TABLE 1

| Example | Melt Temp. (°C.) | Initiator Mixture | Base Polymer Flow Rate (g/min) |
|---|---|---|---|
| 1 | 180 | L101/L130 | 48.3 |
| 2 | 200 | L101/L130 | 60.3 |
| 3 | 220 | L101/L130 | 32.5 |
| 4 | 180 | L101/TBHP | 47.4 |
| 5 | 200 | L101/TBHP | 42.3 |
| 6 | 220 | L101/TBHP | 31.4 |
| 7 | 180 | L101/DTBP | 43.6 |
| 8 | 200 | L101/DTBP | 34.4 |
| 9 | 220 | L101/DTBP | 33.0 |

Grafting of the VDM to the polypropylene was confirmed by two methods. In the first method, samples in Table 1 were extracted with boiling acetone in a conventional extraction apparatus until a stable weight loss was reached in order to remove unreacted monomer. The polymer was analyzed by infrared spectroscopy before and after extraction. Grafting of VDM to polypropylene was confirmed by the presence of strong absorption bands at 1827 cm$^{-1}$ (azlactone ring), 1718 cm$^{-1}$ (hydrolyzed ring to acid), and 1653 cm$^{-1}$ (amide).

The second method used to confirm grafting of the vinyl azlactone to the base polymer involved elemental nitrogen analysis using the well known Kjeldahl method.

The graft copolymer of Example 1 was found to be 0.14% N. This value correlates with the theoretical value of 0.18% N and indicates that 78% of the monomer reacted during the grafting process, and the graft copolymer is about 3.3% by weight grafted 2-alkenyl azlactone.

Samples of the graft copolymers with thickness of about 0.13 mm were made by pressing (at a pressure of about 41.4 kPa for 30 seconds using a Wabash heated press, Wabash, Ind.) about 10 g of the graft copolymers between teflon coated aluminum plates at about 200° C. The pressed samples were quenched from the molten state to the solid state in a room temperature water bath. 180° Peel adhesion tests were run on these samples and on an ungrafted polypropylene resin base polymer control sample prepared the same way, using an acrylate-based pressure-sensitive adhesive tape with a 180° peel adhesion to glass of 110 g/cm. The results are shown in Table 2 wherein each number represents the average of five independent determinations. 180° Peel Adhesion Test: A 2.5 cm wide, 20.3 cm long strip of pressure-sensitive adhesive tape is adhered to a 10.1 cm wide, 15.2 cm long sheet of a test substrate (a pressed sample of a graft copolymer of the invention) with a free end of the tape extending beyond the end of the test substrate. The tape/substrate sample is rolled twice with a 1.35 kg hard rubber roller to ensure contact between the adhesive and the test substrate. The sample is aged at room temperature for 24 hours. The free end of the tape is removed from the test substrate at a rate of 15.2 cm/minute using a Slip/Peel Tester, (available from Instrumentors, Inc. Strongsville, Ohio).

TABLE 2

| Example | Peel Force (g/cm) |
|---|---|
| Control | 165 |
| 1 | 355 |
| 2 | 435 |
| 3 | 405 |
| 4 | 250 |
| 5 | 460 |
| 6 | 435 |
| 7 | 375 |
| 8 | 500 |
| 9 | 500 |

Table 2 indicates increased surface adhesion in all samples when compared to the polypropylene control. The graft copolymers of Examples 2, 3, 5, 6, 8 and 9 exhibited about a 3-fold increase in adhesion relative to the control and the adhesive transferred entirely from the tape to the substrate.

The viscosities of the graft copolymer of Example 2 and the polypropylene base polymer were determined at various shear rates as set forth in Table 3 at melt temperatures of 190° C. and 220° C. The results are set forth in Table 3.

TABLE 3

| | Viscosity (PaSec) | | | |
|---|---|---|---|---|
| Shear Rate (1/sec.) | Polypropylene (190° C.) | Example 2 (190° C.) | Polypropylene (220° C.) | Example 2 (220° C.) |
| 150 | 198.5 | 109.0 | — | — |
| 400 | 114.0 | 71.5 | — | — |
| 700 | 84.0 | 53.0 | 82.0 | 17.5 |
| 1700 | 58.0 | 40.0 | 50.5 | 11.5 |

TABLE 3-continued

| Shear Rate (1/sec.) | Viscosity (PaSec) | | | |
|---|---|---|---|---|
| | Polypropylene (190° C.) | Example 2 (190° C.) | Polypropylene (220° C.) | Example 2 (220° C.) |
| 3400 | 39.0 | 24.0 | 34.0 | 8.5 |
| 6800 | 30.0 | 16.0 | 25.0 | 6.5 |
| 17000 | — | — | 16.0 | 4.0 |
| 34000 | — | — | 10.5 | 3.0 |

Graft copolymers of the invention are seen to exhibit an improvement in flow characteristics, which results in easier processing relative to the base polymer.

A 0.13 mm thick film of the graft copolymer of Example 1 was prepared as described above. The film was then independently heat sealed to samples of ethylene-propylene diene monomer rubber (EPDM rubber, Exxon Chemical, Houston, Tex.) and Santoprene TM thermoplastic rubber film (Monsanto, St. Louis, Mo.). The heat-sealing was done at a temperature of about 210° C., a pressure of about 620 kPa (90 psi) and a dwell time of about 45 seconds using a Sentinel TM Heat-Sealer (Packaging Industries, Hyannis, Mass.) with a 0.10 mm thick polyester film as a liner. The resulting seals between the graft copolymer film and both the EPDM rubber and the Santoprene TM thermoplastic rubber could not be broken by hand. A control polypropylene film subjected to the same heat-sealing conditions afforded no seal to either the EPDM rubber or the Santoprene TM thermoplastic rubber. This shows the usefulness of a graft copolymer of the invention as a high temperature thermoplastic adhesive.

Examples 10-13

Polystyrene resin base polymer (Styron TM 685-DW, Dow Chemical Co., Midland, Mich.) was mixed with 0.5 wt % Lupersol TM 101 for 30 minutes. This mixture was purged under nitrogen for 30 minutes and then extruded at a melt temperature of 210° through the twin-screw extruder described in Example 1. Polymer flow rate was maintained at 40 g/min. The monomeric 2-alkenyl azlactone (VDM or IDM) was introduced in the second barrel section of the extruder at 2 mL/min. The calculated percent azlactone grafted onto the polystyrene are shown in Table 4, wherein PS designates polystyrene.

TABLE 4

| Grafted Polystyrene Azlactone Copolymers | | |
|---|---|---|
| Example | Graft Copolymer | Wt. % Azlactone |
| 10 | PS/VDM | 2.8 |
| 11 | PS/VDM | 2.8 |
| 12 | PS/IDM | 0.5 |
| 13 | PS/IDM | 0.4 |

The data in Table 4 suggests that VDM is more reactive in the process of the invention, since at equal concentrations, VDM incorporation into the resultant graft copolymer was about 5 times that of IDM.

Example 14

Polybutylene resin base polymer (Shell TM 0200, Shell Chemical Co., Houston, TX) was premixed with 0.5 wt % Lupersol TM 101 for 30 minutes. This base polymer/initiator mixture was then purged under gaseous nitrogen for 30 minutes and then extruded using the general method of Example 1. The resin in the hopper and in the feed zone of the extruder was kept under nitrogen purge. The barrel sections were heated at 170° C. Polymer/initiator flow rate was kept at around 40 g/min. IDM was added at a rate of 2 mL/min. The product graft copolymers were collected for characterization. Analysis showed that 0.32% IDM had been grafted onto the base polymer (i.e., 6.4% of the IDM present had been grafted).

Examples 15 and 16

Polybutylene resin base polymer (Shell TM 0200) was premixed with 0.5 wt % Lupersol TM 101 for 30 minutes. This base polymer/initiator mixture was purged under gaseous nitrogen for 30 minutes and then extruded following the general method of Example 1. The barrel sections were heated at a temperature of 170° (Example 15) and in another run (Example 16) at a temperature of 190°. The resin in the feed hopper and in the feed zone of the extruder was kept under nitrogen purge. The polymer/initiator flow rate was kept at about 40 g/min and VDM was added at a rate of 2 mL/min. The product graft copolymers were collected for characterization and analysis. In Example 15, (170° C.) 28% of the VDM was grafted onto the polybutylene and the graft copolymer comprised 1.4% grafted VDM by weight. In Example 16 (190° C.) 48% of the VDM was grafted onto the polybutylene, and the graft copolymer comprised 2.4% grafted VDM by weight.

Pressed samples were made as described in Examples 1-9 by pressing about 10 grams of the samples of Examples 15 and 16 and ungrafted polybutylene resin base polymer (Control) between teflon coated aluminum plates at 200° C. to a thickness of 0.13 mm. The pressed samples were quenched in a room temperature water bath. Peel adhesion tests as described in Examples 1-9 were run. The results are shown in Table 5.

TABLE 5

| Example | Peel Force (g/cm) |
|---|---|
| Control | 145 (±7) |
| 15 | 165 (±8) |
| 16 | 150 (±7) |

Results in Table 5 indicate that Example 15 exhibits significantly increased adhesion when tested against the polybutylene control. While the material of Example 16 also shows increased adhesion, the increase is within the margin of error in the method.

Examples 17-43 and Comparative Examples a-i

Polypropylene/2-alkenyl azlactone graft copolymers were prepared as described in Examples 1-9, except that in Examples 17-20 and Comparative Examples a-h only one initiator, Lupersol TM 101 (L101), was used in the amount set forth in Table 6, in Examples 21-31 and Comparative Example i, only one initiator, Lupersol TM 130 (L130), was used in the amount set forth in Table 6, and in Examples 32-43 a 1:1 mixture of initiators Lupersol TM 101 and Lupersol TM 130 was used in the amount set forth in Table 6. Screw speed was 100 rpm, and monomer flow was 2 mL/min. % VDM grafted was determined using a Perkin-Elmer Model 240C Elemental Analyzer to determine % N. Peel adhesion was determined on selected samples and polypropylene resin base polymer (Control) as in Examples 1-9 using an Instron 1122 peel adhesion tester. Processing conditions, i.e., melt temperature and total flow, mole percent VDM reacted, weight percent VDM, and peel adhesion test values are shown in Table 6.

Table 6 shows that the graft copolymers of the invention exhibit improved adhesion properties relative to the polypropylene control sample. Further, Comparative Examples a-h of Table 6 show that Lupersol ™ 101, with a relatively high rate of decomposition, is not an effective initiator at higher temperatures and lower concentrations, as incorporation of the azlactone moiety is low in such cases.

TABLE 6

| Example | Initiator (Conc. wt %) | Melt Temp (°C.) | Total Flow (g/min) | Mol % VDM Reacted | Wt. % VDM | Peel Force g/cm |
|---|---|---|---|---|---|---|
| a | L101 (0.1) | 180 | 40.1 | 0 | — | — |
| b | L101 (0.1) | 200 | 41.8 | 0 | — | — |
| c | L101 (0.1) | 220 | 35.2 | 0 | — | — |
| 17 | L101 (0.25) | 180 | 37.4 | 26 | 1.4 | — |
| d | L101 (0.25) | 200 | 39.4 | 0 | — | — |
| e | L101 (0.25) | 220 | 29.8 | 0 | — | — |
| 18 | L101 (0.5) | 180 | 31.2 | 19 | 1.2 | — |
| f | L101 (0.5) | 200 | 36.2 | 0 | — | — |
| g | L101 (0.5) | 220 | 29.5 | 0 | — | — |
| 19 | L101 (1.0) | 180 | 31.1 | 53 | 3.4 | 300 |
| 20 | L101 (1.0) | 200 | 30.7 | 51 | 3.3 | 290 |
| h | L101 (1.0) | 220 | 31.5 | 0 | — | — |
| 21 | L130 (0.1) | 180 | 35.4 | 100 | 5.6 | 285 |
| 22 | L130 (0.1) | 200 | 33.5 | 100 | 6.0 | 230 |
| i | L130 (0.1) | 220 | 34.5 | 0 | — | — |
| 23 | L130 (0.25) | 180 | 36.8 | 100 | 5.4 | 240 |
| 24 | L130 (0.25) | 200 | 32.6 | 89 | 5.5 | 240 |
| 25 | L130 (0.25) | 220 | 32.3 | 68 | 4.2 | 240 |
| 26 | L130 (0.5) | 180 | 26.1 | 70 | 5.4 | — |
| 27 | L130 (0.5) | 200 | 28.2 | 51 | 3.5 | 230 |
| 28 | L130 (0.5) | 220 | 24.7 | 38 | 3.1 | — |
| 29 | L130 (1.0) | 180 | 36.8 | 93 | 5.1 | 240 |
| 30 | L130 (1.0) | 200 | 36.8 | 78 | 4.2 | 280 |
| 31 | L130 (1.0) | 220 | 40.0 | 80 | 4.0 | — |
| 32 | 0.1 | 180 | 36.5 | 53 | 2.9 | 235 |
| 33 | 0.1 | 200 | 36.4 | 53 | 2.9 | 220 |
| 34 | 0.1 | 220 | 27.3 | 37 | 2.7 | — |
| 35 | 0.25 | 180 | 32 | 37 | 2.3 | 225 |
| 36 | 0.25 | 200 | 32 | 17 | 1.1 | 235 |
| 37 | 0.25 | 220 | 32 | <16 | <1.1 | 250 |
| 38 | 0.50 | 180 | 30 | 75 | 5.0 | 295 |
| 39 | 0.50 | 200 | 40.3 | 82 | 4.1 | 310 |
| 40 | 0.50 | 220 | 85.0 | 46 | 1.1 | — |
| 41 | 1.0 | 180 | 37.3 | 82 | 4.4 | 310 |
| 42 | 1.0 | 200 | 33.4 | 63 | 3.8 | 230 |
| 43 | 1.0 | 220 | 28.9 | 41 | 2.8 | — |
| Control | — | 180 | 40 | — | — | 210 |

Likewise, Comparative Example i indicates that Lupersol ™ 130 is not an effective initiator at higher temperature and lower concentration. Further, Examples 32–43 demonstrate that an initiator system comprising two initiators is effective at high temperatures and at lower concentration of initiator.

Molecular weights of various select samples and a polypropylene resin base polymer control were determined using a Jordi mixed bed column in a Waters 150° C. high temperature chromatograph. The results are set forth in Table 7.

TABLE 7

| Example | Initiator (wt. %) | MW |
|---|---|---|
| d | L-101 (0.25) | 66,800 |
| 23 | L-130 (0.25) | 57,600 |
| 35 | L-101 (0.125)/L-130(0.125) | 71,100 |
| 18 | L-101 (0.50) | 42,600 |
| 26 | L-130 (0.50) | 38,500 |
| 38 | L-101 (0.25)/L-130(0.25) | 44,800 |
| 19 | L-101 (1.0) | 33,800 |
| 29 | L-130 (1.0) | 18,500 |
| 41 | L-101 (0.50)/L-130(0.50) | 38,000 |

TABLE 7-continued

| Example | Initiator (wt. %) | MW |
|---|---|---|
| Control | | 120,000 |

The data in Table 7 show that the use of two initiators in combination gives better retention of molecular weight (i.e. less net degradation) than one initiator at the same total initiator concentration.

Example 44

Figure 3:
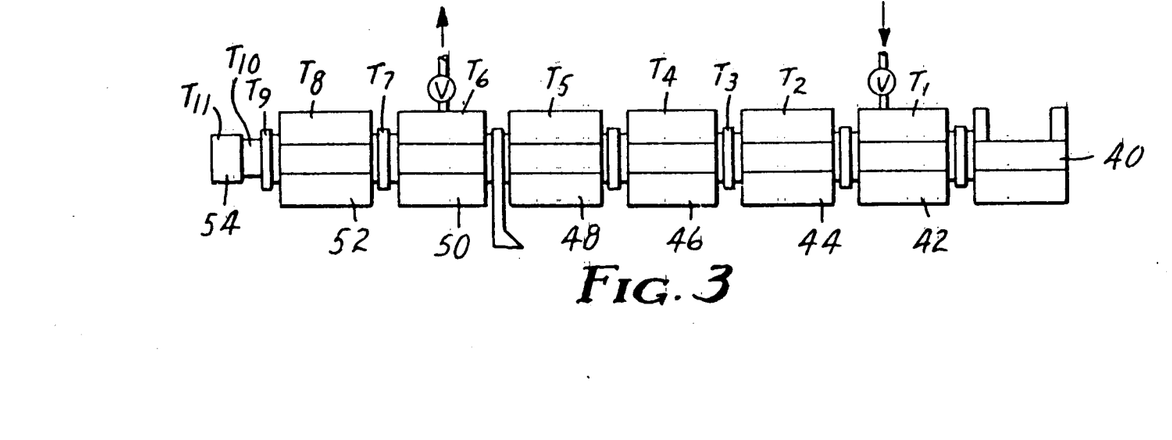
FIG. 3 is a flow diagram of another counter-rotating twin screw extruder useful in the process of this invention.

This example describes the scale-up graft polymerization of VDM monomer onto polypropylene using a 67 mm twin screw extruder in the counter rotating mode. The process is described with reference to FIG. 3. FIG. 3 shows a twin-screw extruder much like that shown in FIG. 2 and described in Examples 1–9. Particularly, the extruder comprises a feed zone 40, a heated barrel that comprises barrel section 42 comprising both an initiation/melt zone and a monomer addition zone, barrel sections 44, 46, and 48 comprising a reaction zone, barrel section 50 comprising a devolatilization zone and barrel section 52 comprising a block zone, and a die 54. Transducer ports (e.g., $T_1$ represents transducer number 1 in barrel section 42) are located as shown in FIG. 3, and thermocouple ports are located in each heated component of the extruder. The extruder was a Leistritz ™ ASFG7GG.

The temperature profile of the extruder was as follows:

| Transducer | T(°C.) |
|---|---|
| 1 | 185 |
| 2 | 180 |
| 3 | 179 |
| 4 | 178 |
| 5 | 190 |
| 6 | 190 |
| 7 | 180 |
| 8 | 180 |
| 9 | 180 |
| 10 | 200 |
| 11 | 218 |

The feed zone was ambient temperature, and screw speed was 50 rpm.

The base polymer feed hopper and the extruder feed throat were purged with nitrogen. The base polymer (Dypro TM 8771), was fed at a rate of 18.1 kg/h using a K-tron 6300 feeder. The initiator (a 1:1 mixture by weight of Lupersol TM 130 and Lupersol TM 101) was purged with nitrogen and fed at a rate of 2 mL/min using a single piston Ruska TM digital positive displacement pump at the downstream end of the feed throat, a distance of 270 mm from the start of the screws. The 2-alkenyl azlactone monomer (VDM) was purged with nitrogen and fed at a rate of 463 mL/h through a high pressure injection valve using a dual piston Ruska TM positive displacement pump, at a distance of 610 mm from the start of the screws. Vacuum venting of unreacted 2-alkenyl azlactone was performed in heated barrel section 50. The product graft copolymer was extruded through a 10strand die that fed into a water bath and a Conair pelletizer.

Analysis indicated that about 86% of the VDM added was grafted onto the base polymer.

Example 45

Using the apparatus and general method of Example 44, a polystyrene/VDM graft copolymer was prepared. The base polymer (Styron TM 685-2G-W, Dow Chemical Co.) was fed at a rate of 22.7 kg/h and the initiator system was added at 2 mL/min to the downstream end of the extruder feed throat. The 2-alkenyl azlactone monomer (VDM) was fed at a rate of 463 mL/h at the end of barrel zone 1. The temperature profile of the apparatus was as follows:

| Transducer | T(°C.) |
|---|---|
| 1 | 190 |
| 2 | 212 |
| 3 | 214 |
| 4 | 214 |
| 5 | 210 |
| 6 | 210 |
| 7 | 212 |
| 8 | 210 |
| 9 | 213 |
| 10 | 222 |
| 11 | 220 |

The feed zone was water-cooled.

Analysis showed that about 98% of the VDM was grafted onto the base polymer.

Example 46

This example describes the binding of radiolabeled anti-human IgE to VDM-grafted polypropylene using the graft copolymer from Example 1 prepared in bead form with a diameter of about 1 mm and a length of about 3 to 4 mm.

Anti-human IgE was purified by Mono Q anion exchange chromatography (pH 8.0, Tris buffer), and radioiodinated with $Na^{125}I$ using Iodo-Beads (Pierce Chemical Co., Rockford, Ill.).

Purified, iodinated anti-IgE prepared above was added to unlabeled anti-IgE to obtain a solution with a concentration of 3.1 μg/mL and a specific radioactivity of 5 to $25 \times 10^3$ counts per minute per microgram (cpm/μg). The labeled antibody solution (150 μL of the 3.1 μg/mL solution) was incubated with the VDM-grafted polypropylene beads for 2 hours at ambient temperature.

The treated beads were then incubated with bovine serum albumin (2.5 mg/mL, Sigma Chemical Co., St. Louis, Mo.) for 60 minutes to react any remaining azlactone moieties and displace adsorbed anti-IgE. The sample was then aspirated and the beads were analyzed for $^{125}I$ using a Packard Auto-gamma scintillation spectrometer (Packard Instruments, United Technologies, Downers Grove, Ill., Model 5230). The degree of irreversible binding of the antibodies to the polymer beads was determined by incubation of the beads with a 0.1% protein-denaturing detergent, sodium dodecylsulfate (SDS), at 37° for 4 hours, which incubation serves to remove adsorbed (as opposed to irreversibly bound) proteins from the beads. Polypropylene resin base polymer beads (Control) prepared in the same manner were also tested. Three replicates of each experiment were performed. The results are shown in Table 8, wherein SDS Resistance refers to the percent of radioactivity remaining after SDS incubation.

TABLE 8

| Example | Antibody Bound (ng/cm²) | SDS Resistance (%) |
|---|---|---|
| Control | 36 | 6.4 |
| 46 | 83 | 24 |

Grafting of VDM more than doubled the amount of immobilized antibody and increased the amount of irreversibly bound antibody almost four-fold relative to the polypropylene control.

Examples 47–50

In Examples 47–50, beads prepared from the azlactone-grafted polystyrene copolymers of Examples 10 and 11 (polystyrene/VDM) and Examples 12 and 13 (polystyrene/IDM), respectively, were treated and tested following the procedure described in Example 46. Polystyrene resin base polymer beads (Control) prepared in the same manner were also treated and tested. The results are summarized in Table 9, wherein SDS Resistance refers to the percent of the radioactivity remaining after incubation with sodium dodecylsulfate as described in Example 46.

TABLE 9

| Example | Antibody Bound (ng/cm²) | SDS Resistance (%) |
|---|---|---|
| Control | 131 | 42 |
| 47 | 81 | 69 |
| 48 | 69 | 77 |
| 49 | 88 | 50 |
| 50 | 95 | 55 |

The amount of antibody bound prior to SDS treatment decreased in the graft copolymers of the invention relative to the polystyrene control. However, SDS resistance of the treated graft copolymers increased by 10 to 30% relative to the polystyrene control. This can be explained as follows: Polystyrene binds proteins by hydrophobic interactions between the polystyrene surface and the protein. Decreasing the hydrophobic nature of the polystyrene surface by addition of a relatively polar, grafted azlactone moiety tends to reduce the absolute amounts of protein bound. Additionally, if the decreased hydrophobicity is caused by a moiety capable of covalently coupling to protein, then the percent SDS resistance will tend to increase.

Examples 51-54

In Examples 51 and 53, the VDM-grafted polystyrene polymer of Example 11 was molded into microtiter 12-well strips. In Examples 52 and 54, the IDM-grafted polystyrene polymer of Example 13 was molded into microtiter 12-well strips. Each well hd a radius of 7 mm, depth of 12 mm, and a capacity of about 0.3 mL. Radiolabeled antibody was bound to the wells at the pH indicated in Table 10, as described in Example 46. A fluorescent ELISA was performed using the unlabeled wells.

Antibody binding and precision studies and immunoassays, using 48 replicates in each example, were performed with wells treated with 3.1 μg/mL antibody solutions prepared as described in Example 46. SDS resistance studies were performed using 16 of the radiolabeled precision study replicates. Eight were incubated with 200 μL of 1.0% SDS for 4 hours at 37° C. and eight with an equal volume of phosphate buffered saline (pH 7.4).

Results are shown in Table 10, wherein CV refers to the coefficient of variation, and FSU refers to fluorescent signal units.

TABLE 10

| Example (type) | Antibody Protein Bound (ng) | Binding CV (%) | SDS Resistance (%) | Immunoassay Activity FSU | CV (%) |
| --- | --- | --- | --- | --- | --- |
| Control* | 74 | 2.7 | 42.6 | 1015 | 6.7 |
| 51 (PS/VDM)* | 70 | 7.7 | 58.6 | 910 | 10.0 |
| 52 (PS/IDM)* | 76 | 4.0 | 47.4 | 1208 | 18.1 |
| Control** | 67 | 2.8 | 39.8 | 1002 | 8.3 |
| 53 (PS/VDM)** | 51 | 9.0 | 66.3 | 772 | 13.9 |
| 54 (PS/IDM)** | 76 | 13.7 | 49.4 | 1086 | 19.4 |

*pH 7.5;
**pH 8.5

Table 10 shows that VDM consistently yields the greater degree of irreversible binding of antibody (i.e., the VDM grafted copolymer has a greater SDS resistance than the IDM grafted copolymer). The immunoassay activity results show that at each pH IDM yields a higher fluorescent signal. However, there is also an increase in the coefficient of variation. Thus, based on precision and the degree of irreversible binding, the VDM-grafted polystyrene appears superior to both the IDM material and the control.

Examples 55-56

In Examples 55 and 56, microtiter wells treated with radiolabeled anti-IgE as described in Examples 51 and 52 were incubated for 13 days at ambient temperature with phosphate-buffered saline (PBS), pH 7.4, or with human serum diluted with an equal part of PBS. The liquid was aspirated from the wells and radioactivity of the well was determined. The wells were then incubated for 4 hours with 1% SDS to remove adsorbed protein, rinsed, and radioactivity again determined. Polystyrene resin base polymer microtiter wells prepared in the same manner (Control) were also tested for radioactivity. Data are given in Table 11.

TABLE 11

| Example | SDS-Resistant Protein Binding (cpm) | | |
| --- | --- | --- | --- |
| | Day 0 | Day 13/PBS | Day 13/Human Serum |
| Control | 1632 | 1950 | 239 |
| 55 (PS/VDM) | 1752 | 2117 | 1712 |
| 56 (PS/IDM) | 1587 | 1820 | 534 |

Data in Table 11 show that the VDM-grafted wells prevented removal of the protein to a greater extent than the IDM-grafted wells. Although it appears that there is increased antibody in all wells after 13 days in PBS this is probably an artifact of the continuing increase in the amount of hydrophobic bonding of protein to a hydrophobic surface as the protein continues to denature onto the surface.

In the serum-incubated wells, serum protein competes for the available surface, replacing practically all but the irreversibly bound protein. In the VDM-grafted copolymer wells there is about a seven-fold increase in retention of protein relative to control wells (97.7% vs 14.6% of their Day 0 values).

Examples 57-58

In Examples 57 and 58, the heights and diameters of beads of the graft copolymers described in Examples 44 and 45, respectively, were measured and their surface areas were calculated. Sufficient beads (4-7) to give a total of 0.5 cm$^2$ to 1.0 cm$^2$ of surface area were placed in 12×75 mm polystyrene test tubes.

Protein A (Genzyme Corp., Boston, Mass.) was radioiodinated and diluted to give a final specific radioactivity of 10,000 cpm/μg of protein dissolved in 10 mM sodium phosphate, 150 mM sodium chloride buffer, pH 7.5, with a final protein concentration of 250 μg/mL.

The Protein A solution (100 μL) was added to each tube of beads and allowed to react for 2 hours with vortex mixing at 15 minute intervals. The reaction was terminated by removal of the protein solution and addition of 200 μL of 0.5 M butylamine in the phosphate buffer described above. This reaction was mixed at 15 minute intervals, and the butylamine solution was removed after 60 minutes. An additional 200 μL of butylamine solution was added to quench further. After 30 minutes the beads were washed three times with 500 μL of the phosphate buffer, transferred to clean test tubes, and monitored for residual radioactivity in a Packard Auto-gamma Scintillation Spectrometer Model 5230.

After radioactivity determination, the tubes of beads were incubated with either PBS or human serum. After two weeks incubations at ambient temperature, the solution was removed from each set of beads, and they were incubated with 1% SDS (sodium dodecylsulfate) at 37° C. AFter 4 hours each tube was rinsed with 3×500 μL of SDS solution and the radioactivity of the beads was determined. Polypropylene and polystyrene resin base beads (Controls) were treated and tested for radioactivity using the procedures used for Examples 57-58. The results are shown in Table 12.

TABLE 12

| Example | Bound Protein (ng/cm$^2$) | PBS-SDS Resistance (%) | Serum-SDS Resistance (%) |
|---|---|---|---|
| 57 (PP/VDM) | 132.0 | 98 | 83 |
| PP control | 8.9 | 84 | 12 |
| 58 (PS/VDM) | 263.0 | 90 | 64 |
| PS control | 18.0 | 70 | 36 |

Table 12 shows that graft copolymers of the invention are more effective than control base polymers at immobilizing Protein A.

Examples 59-60

This example demonstrates the binding of anti-human IgE to microtiter reaction wells and the biological activity of such reaction wells in a fluorescent ELISA test.

VDM-grafted polypropylene microtiter wells were prepared from the copolymer from Example 44. Affinity-purified anti-human IgE was radioiodinated and diluted for binding studies to a concentration of 2,000 to 10,000 cpm/μg. Unlabeled antibody was used for the immunochemical studies. The wells were treated overnight with 10 mM sodium phosphate, 150 mM sodium chloride, pH 7.4 (Example 59), or 100 mM sodium carbonate, pH 9.4 (Example 60) with a 5 μg/mL antibody solution followed by a 45 minute incubation with 2.5 mg/mL bovine serum albumin. The amount of antibody bound was determined by isotopic decay. SDS resistance was determined by redetermination of the amount of antibody bound after incubation of the well with 1% SDS for 4 hours at 37° C. Polypropylene resin base polymer microtiter wells (Controls) were prepared, treated, and tested using the procedures used for Examples 59 and 60. Immunochemical activity was determined as described in Examples 51-54. Diluted hyperallergenic serum was used to determine the mean fluorescent signal units (FSU) and coefficient of variation (CV) values. The results are set forth in Table 13.

TABLE 13

| | Binding Activity | | Immunochemical Activity | |
|---|---|---|---|---|
| Example (pH) | Protein Bound (ng) | SDS Resistance (%) | Mean FSU | CV (%) |
| Control (7.4) | 196 | 6 | 747 | 7.2 |
| 59 (PP/VDM) (7.4) | 202 | 88 | 840 | 6.1 |
| Control (9.4) | 153 | 6 | 535 | 7.1 |
| 60 (PP/VDM) (9.4) | 148 | 91 | 480 | 7.1 |

The data in Table 13 show that the VDM/polypropylene graft copolymer of the invention affords an increase in the amount of irreversibly bound antibody without negatively affecting the coefficient of variation of the immunochemical activity of the treated well. The incorporation of the azlactone functionality makes the surface more hydrophilic so that protein does not denature onto the surface, while tightly binding the protein so that it does not wash off during assay.

Examples 61 and 62

These examples demonstrate the binding of anti-human IgE to microtiter reaction wells prepared from VDM-grafted polystyrene materials of Example 45, and the biological activity of such wells.

Following the procedures used in Examples 59 and 60, microtiter wells prepared from the VDM-grafted polystyrene were prepared, treated at the pH indicated in Table 14, and tested. Polystyrene resin base polymer microtiter wells (Controls) were prepared, treated and tested using the same procedures. The results are set forth in Table 14.

TABLE 14

| | Binding Activity | | Immunochemical Activity | |
|---|---|---|---|---|
| Example (pH) | Protein Bound (ng) | SDS Resistance (%) | Mean FSU | CV (%) |
| Control (7.4) | 215 | 23 | 594 | 7.1 |
| 61 (PS/VDM) (7.4) | 207 | 45 | 548 | 4.0 |
| Control (9.4) | 211 | 37 | 736 | 7.9 |
| 62 (PS/VDM) (9.4) | 192 | 79 | 768 | 4.2 |

As seen in Table 14, the greatest change observed when using a graft copolymer of the invention relative to the control base polymer is in the amount of tightly bound protein, which doubles at each pH. An additional advantage seen is a reduction in the variation (CV) of the fluorescent signal associated with the immunochemical activity.

Examples 63-66

These examples demonstrate the resistance of azlactone on the surface of VDM-grafted polystyrene wells to degradation by temperature and water vapor.

Untreated wells of material from Example 45 were stored under the particular storage conditions set forth below for 4 and 11 days, then treated with either radioiodinated antibody (for binding studies) or unlabeled antibody at pH of 9.4 using the general method of Examples 59-60. The four storage conditions were: room temperature (RT) desiccated (Example 63); RT, ambient humidity (varying from day to day but generally high) (Example 64); 37° C., ambient humidity (stored in a tissue culture incubator without elevated humidity) (Example 65); and 37° C., high humidity (stored in a tissue culture incubator with controlled atmosphere of 5% $CO_2$ and 98% relative humidity) (Example 66).

TABLE 15

| BINDING STUDIES | | | | |
|---|---|---|---|---|
| | Protein Bound (ng) | | SDS Resistance (%) | |
| Example | Day 4 | Day 11 | Day 4 | Day 11 |
| 63 | 219 | 200 | 80 | 80 |
| 64 | 218 | 198 | 82 | 82 |
| 65 | 217 | 202 | 81 | 80 |
| 66 | 228 | 196 | 74 | 75 |

| IMMUNOCHEMICAL STUDIES | | |
|---|---|---|
| | FSU (CV) | |
| Example | Day 4 | Day 11 |
| 63 | 437 (8.0) | 374 (9.0) |
| 64 | 419 (5.0) | 415 (2.8) |

TABLE 15-continued

| 65 | 507 (7.4) | 519 (3.8) |
| 66 | 461 (6.1) | 380 (5.6) |

No loss of protein-binding capacity of the wells caused by 11 days of storage of the wells at elevated temperature and humidity was observed. However, there is a small but significant reduction (from 80% to 74%) in the SDS resistant binding. Since there is no change at 37° C., ambient humidity, this reduction in tight binding appears to be more closely associated with moisture than with temperature, consistent with water opening the azlactone ring before the protein treatment step.

Paired t-test analysis of the immunochemical results indicate that at the 0.05 level there is no significant difference between day 4 and day 11 for any of the treatments, nor is there a difference between RT, desiccated and 37° C., elevated humidity conditions. Thus, manufactured wells appear to be stable under normal laboratory or manufacturing conditions.

The various modifications and alterations of this invention will be apparent to those skilled in the art without departing from the scope and spirit of this invention and this invention should not be restricted to that set forth herein for illustrative purposes.

The claimed invention is:

1. A graft copolymer comprising a poly-alpha-olefin base polymer that does not undergo substantial crosslinking under polymer melt conditions in the presence of a free radical initiator, having grafted thereon a monomeric 2-alkenyl azlactone of the formula wherein
R$_1$ is hydrogen, or methyl;
R$_2$ and R$_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or R$_2$ and R$_3$ taken together with the carbon to which they are joined can form a carbocyclic ring containing 4 to 12 ring atoms, and
n is an integer 0 or 1.

2. A graft copolymer according to claim 1, wherein the base polymer is selected from the group consisting of polybutylene, polypropylene, and polystyrene.

3. A graft copolymer according to claim 1, wherein n is zero.

4. A graft copolymer according to claim 1, wherein the 2-alkenyl azlactone is selected from the group consisting of
2-ethenyl-1,3-oxazoline-5-one,
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-4-methyl-4-phenyl-1,3-oxazolin-5-one,
2-isopropenyl-4-methyl-4-benzyl-1,3-oxazolin-5-one, and
2-ethenyl-4,4-pentamethylene-1,3-oxazolin-5-one.

5. A graft copolymer according to claim 1, wherein the 2-alkenyl azlactone is 2-ethenyl-4,4-dimethyl-1,3-oxazolin-5-one.

6. A graft copolymer according to claim 1, wherein the 2-alkenyl azlactone is 2-isopropenyl-4,4-dimethyl-1,3-oxazolin-5-one.

7. A graft copolymer according to claim 1, comprising about 0.1% to about 20% by weight of grafted 2-alkenyl azlactone.

8. A graft copolymer according to claim 1, comprising about 0.5% to about 10% by weight of grafted 2-alkenyl azlactone.

* * * * *